United States Patent
Kim et al.

[11] Patent Number: 5,814,795
[45] Date of Patent: Sep. 29, 1998

[54] NUXILIARY COOKING DEVICE FOR MICROWAVE OVENS

[75] Inventors: Dae-Rae Kim; Jeong-Hee Lee, both of Suwon, Rep. of Korea

[73] Assignee: Samsung Electronics Co., Ltd., Suwon, Rep. of Korea

[21] Appl. No.: 869,287

[22] Filed: Jun. 5, 1997

[30] Foreign Application Priority Data

| Jun. 12, 1996 | [KR] | Rep. of Korea | 1996-15590 U |
| Aug. 12, 1996 | [KR] | Rep. of Korea | 1996-33441 |
| Aug. 12, 1996 | [KR] | Rep. of Korea | 1996-33442 |
| Apr. 8, 1997 | [KR] | Rep. of Korea | 1997-12894 |

[51] Int. Cl.$^6$ .............................. H05B 6/80; A47J 37/04
[52] U.S. Cl. ........................... 219/732; 219/762; 99/419; 99/421 R; 99/DIG. 14
[58] Field of Search ...................... 219/732, 725, 219/762; 99/419, 421 R, 421 V, DIG. 14

[56] References Cited

U.S. PATENT DOCUMENTS

| 4,074,102 | 2/1978 | Asen | 219/732 |
| 4,724,753 | 2/1988 | Neyman et al. | 99/419 |
| 4,887,523 | 12/1989 | Murphy et al. | 99/419 |
| 5,069,117 | 12/1991 | Schlessel | 99/419 |
| 5,552,585 | 9/1996 | Fleck et al. | 219/732 |

FOREIGN PATENT DOCUMENTS

95-11973  5/1995  Rep. of Korea .

Primary Examiner—Philip H. Leung
Attorney, Agent, or Firm—Burns, Doane, Swecker & Mathis, L.L.P.

[57] ABSTRACT

A microwave oven has an auxiliary cooking device disposed within a cooking chamber for fixing foodstuffs to be cooked. The auxiliary cooking device includes a supporting base placed on the cooking chamber, a coupling member coupled on the supporting base, a main fixing bar on which relatively large foodstuffs are fixed, and a plurality of auxiliary fixing bars on which relatively small foodstuffs are fixed. The main fixing bar is supported on the supporting base or the coupling member. The auxiliary fixing bars are removably mounted on the coupling member.

9 Claims, 12 Drawing Sheets

NUXILIARY COOKING DEVICE FOR MICROWAVE OVENS

BACKGROUND OF THE INVENTION (1) Field of the Invention

The present invention relates to a microwave oven and, more particularly, to an auxiliary cooking device for a microwave oven which is easy to manufacture and to store after use.

(2) Description of the Related Art

An auxiliary cooking device for grilling foodstuffs disposed thereon within a cooking chamber of a microwave oven is known. Such an auxiliary cooking device is disclosed in Korean laid-open patent publication No. 95-11973. This will be described hereinafter with reference to FIG. 10.

Figure 10:
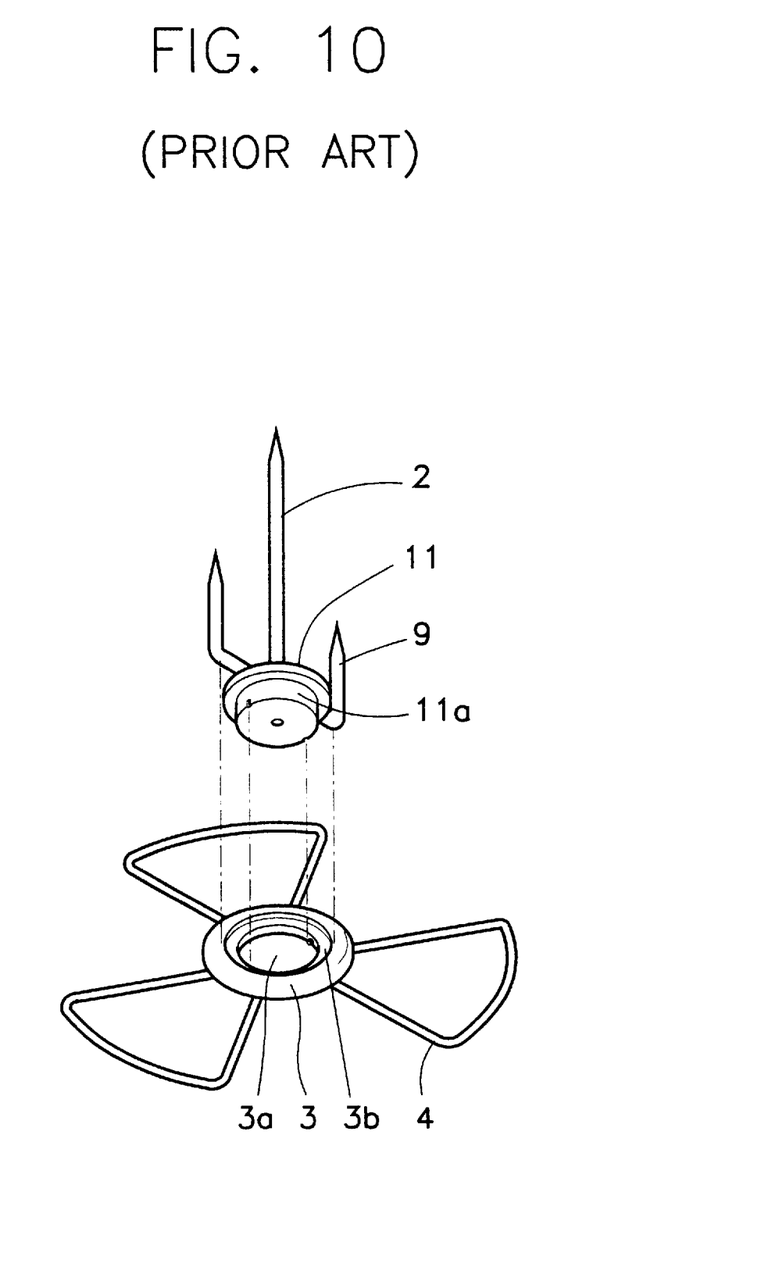
FIG. 10 is a perspective view of a conventional auxiliary cooking device.

The auxiliary cooking device comprises a supporting base 4, which is generally placed on a base (not shown) of the cooking chamber or a cooking tray (not shown), a fixing member 3 coupled on a center of the supporting base 4 and provided with an opening 3a and a seat 3b formed around the opening 3a, a cover member 11 having a projection 11a which is positioned on the seat 3b and engaged with the opening 3a. A foodstuffs supporting bar 2 and a foodstuffs balancing bar 9 are fitted on the cover member 11.

However, since the above described prior auxiliary cooking device does not have auxiliary bars for fixing small foodstuffs such as a small piece of sliced meat, it is not possible to cook such small foodstuffs.

Figure 11A:
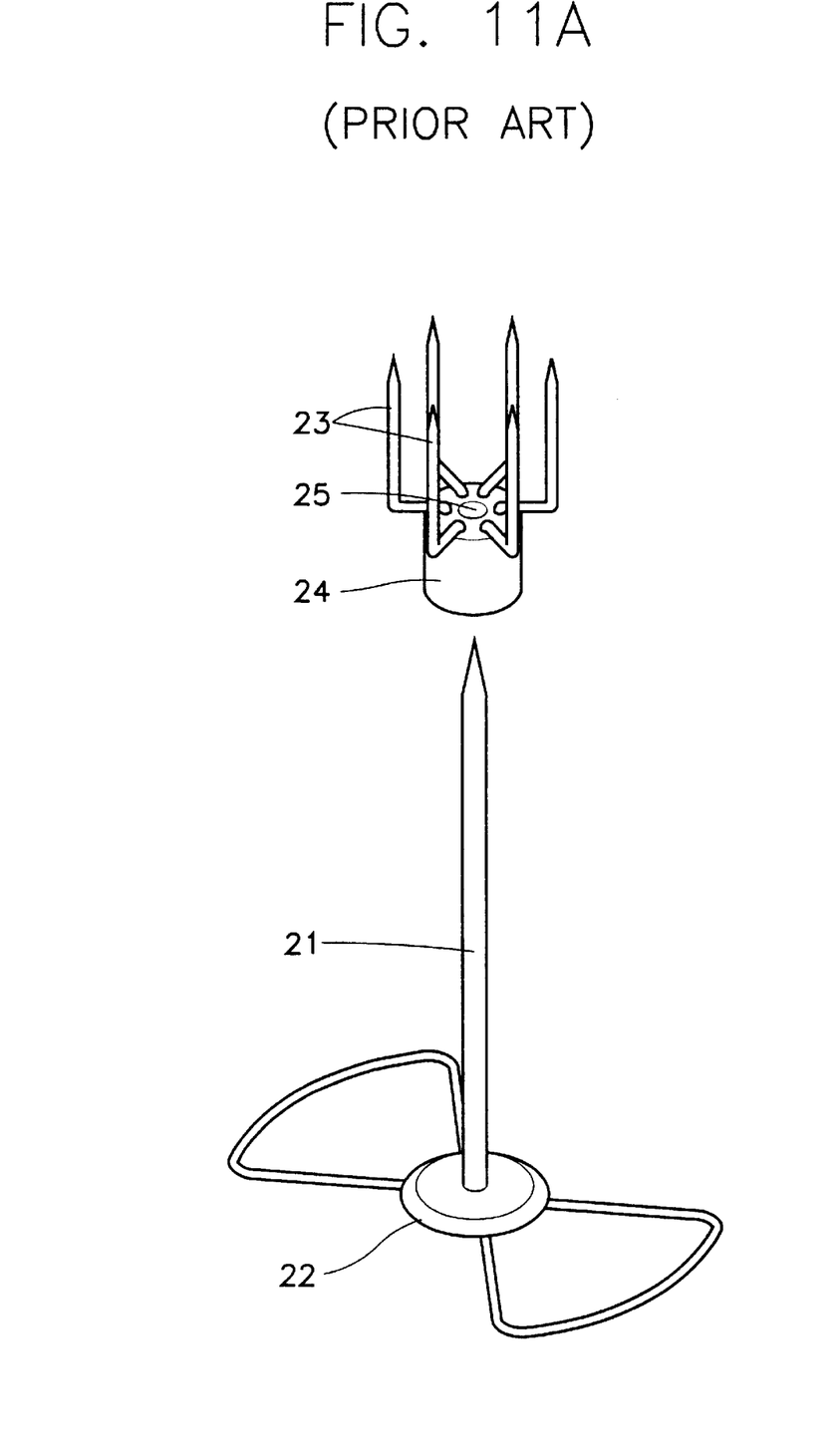
FIGS. 11A and 11B are perspective views of other conventional auxiliary cooking devices.
Figure 11B:
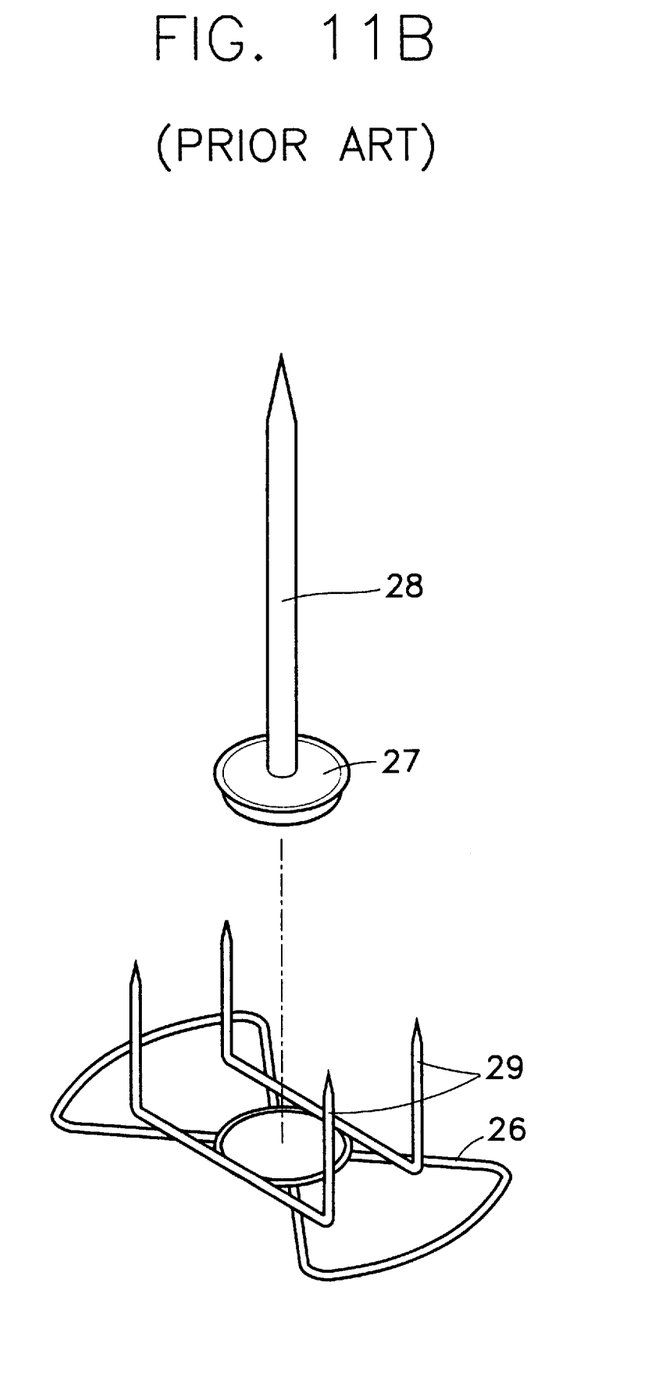

To solve this problem, auxiliary cooking devices as shown in FIGS. 11A and 11B have been developed.

Referring first to FIG. 11A, the auxiliary cooking device comprises a main supporting bar 21 used for fixing relatively big food items, the main supporting bar 21 being erected and coupled on a supporting base 22, and a plurality of auxiliary supporting bars 23 for fixing small food items, the auxiliary supporting bars 23 being welded on a coupling member 24 having a hole 25 for allowing the insertion of the main supporting bar 21 therethrough.

Referring to FIG. 11B, another prior art auxiliary cooking device comprises a plurality of auxiliary supporting bars 29, on which small foods are placed, welded on a supporting base 26, and a main supporting bar 28 for fixing relatively big food items, the main supporting bar 28 being erected and coupled on a connecting member 27 which is removably coupled to the supporting base 26.

However, because an extra process for welding the auxiliary supporting bars 23 or 29 on the coupling member 24 or the supporting base 26 is required, the manufacturing process is complicated. In addition, since the auxiliary supporting bars 23 or 29 are fixedly mounted to the device, storage of the above prior art auxiliary cooking devices is troublesome.

SUMMARY OF THE INVENTION

Therefore, the present invention is made in an effort to solve the above described problems.

It is an object of the present invention to provide an auxiliary cooking device which is easy to assemble and store by making an auxiliary fixing bar assembly to be removably engaged on the device.

To achieve the object, the present invention provides a microwave oven having an auxiliary cooking device disposed within a cooking chamber for fixing foodstuffs to be cooked, the auxiliary cooking device comprising:

a supporting base placed on the cooking chamber;

a coupling member coupled on the supporting base;

a main fixing bar on which relatively large foodstuffs are fixed, the main fixing bar being supported on the supporting base or the coupling member; and a plurality of auxiliary fixing bars on which relatively small foodstuffs are fixed, the auxiliary fixing bars being removably mounted on the coupling member.

The supporting base is configured in an opened ring shape, opposite ends of which extend inward so as to provide supporting legs, and The main fixing bar extends upward from a free end of one of the supporting legs.

The coupling member comprises:

a through hole into which the main fixing bar is inserted;

a plurality of inserting holes through which the auxiliary fixing bars are removably inserted;

a plurality of upper periphery grooves communicating with the corresponding inserting holes so as to prevent the auxiliary fixing bars from rotating; and a lower periphery groove communicating with the through holes so as to prevent the main fixing bar from rotating when it is inserted into the through hole.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Preferred embodiments of the present invention will now be described in detail with reference to the accompanying drawings.

Figure 1:
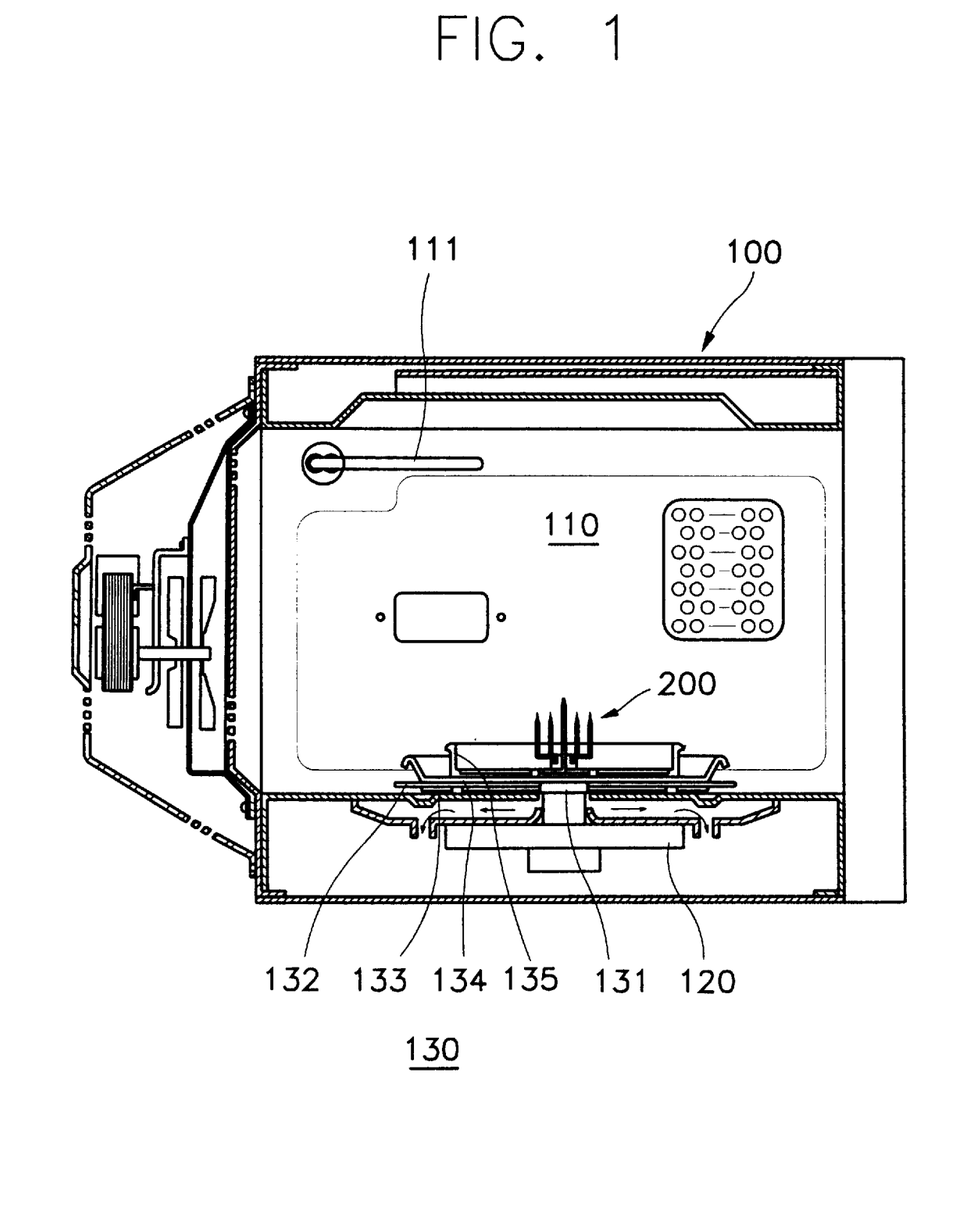
FIG. 1 is a sectional view illustrating a microwave oven in which an auxiliary cooking device according to the present invention is mounted.

FIG. 1 shows a microwave oven in which an auxiliary cooking device according to the present invention is mounted.

As shown in the drawing, a cooking chamber 110 is provided in a microwave oven 100. A motor 120 is mounted below the cooking chamber 110, and a cooking tray assembly 130, rotated by the motor 120, is mounted on a bottom surface of the cooking chamber 110.

The cooking tray assembly 130 comprises a connecting member 131, a glass dish 132, rollers 133, and, if needed, a barbecue dish 134, and an oil dish 135. Describing more in detail, the connecting member 131 transmits rotating force of the motor 120 to the glass dish 132, and the rollers 133 are disposed between the bottom face of the cooking chamber 110 and the glass dish 132 to rotatably support the glass dish 132. When barbecuing, the barbecue dish 134 is located on the glass dish 132, while the oil dish 135, for collecting residual oil from the foodstuffs being cooked, is disposed on the barbecue dish 134. Reference numeral 111 in the drawing represents a heater.

An auxiliary cooking device 200 for fixing foodstuffs to be cooked is disposed on the oil dish 135.

Figure 2:
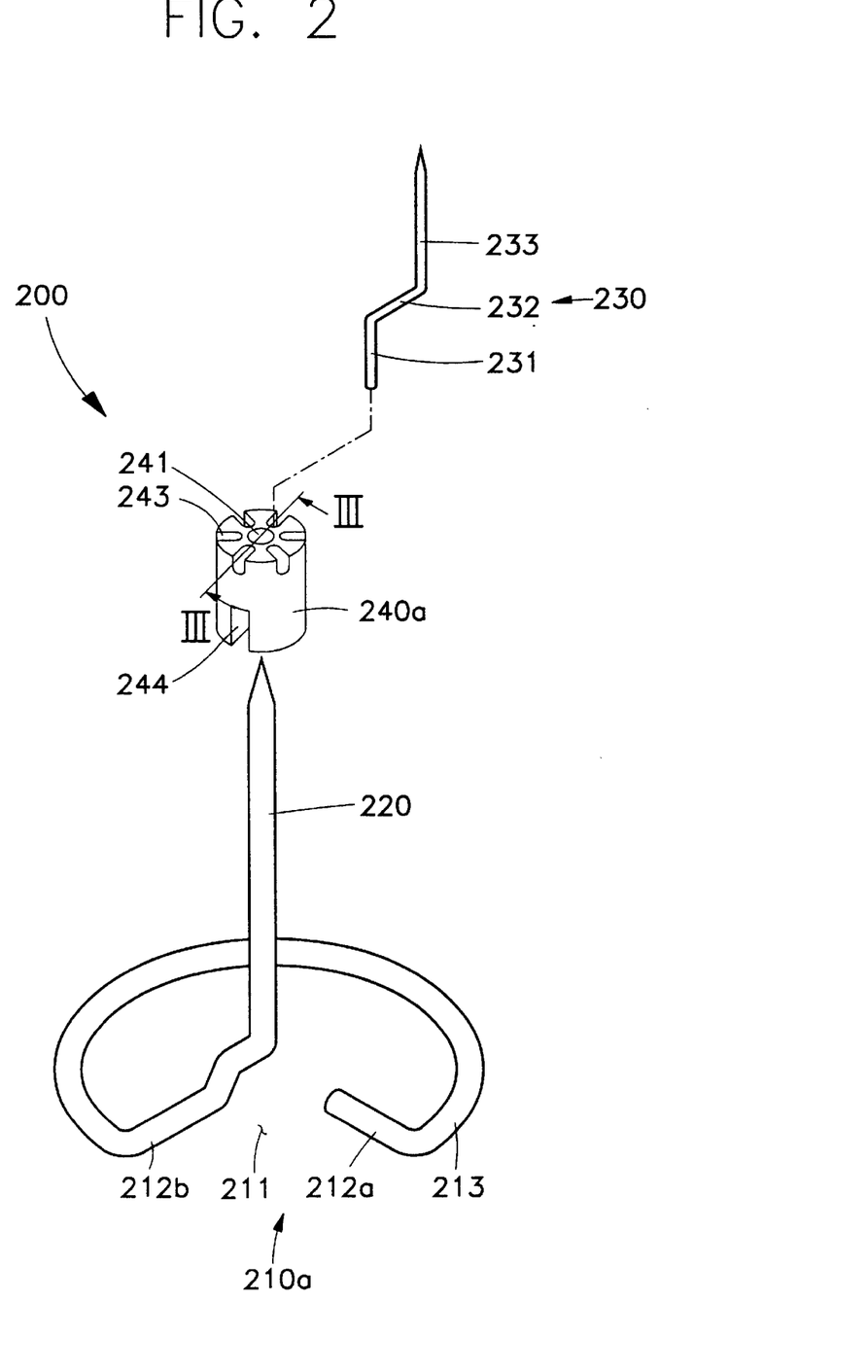
FIG. 2 is an exploded perspective view of an auxiliary cooking device according to a first embodiment of the present invention.
Figure 3:
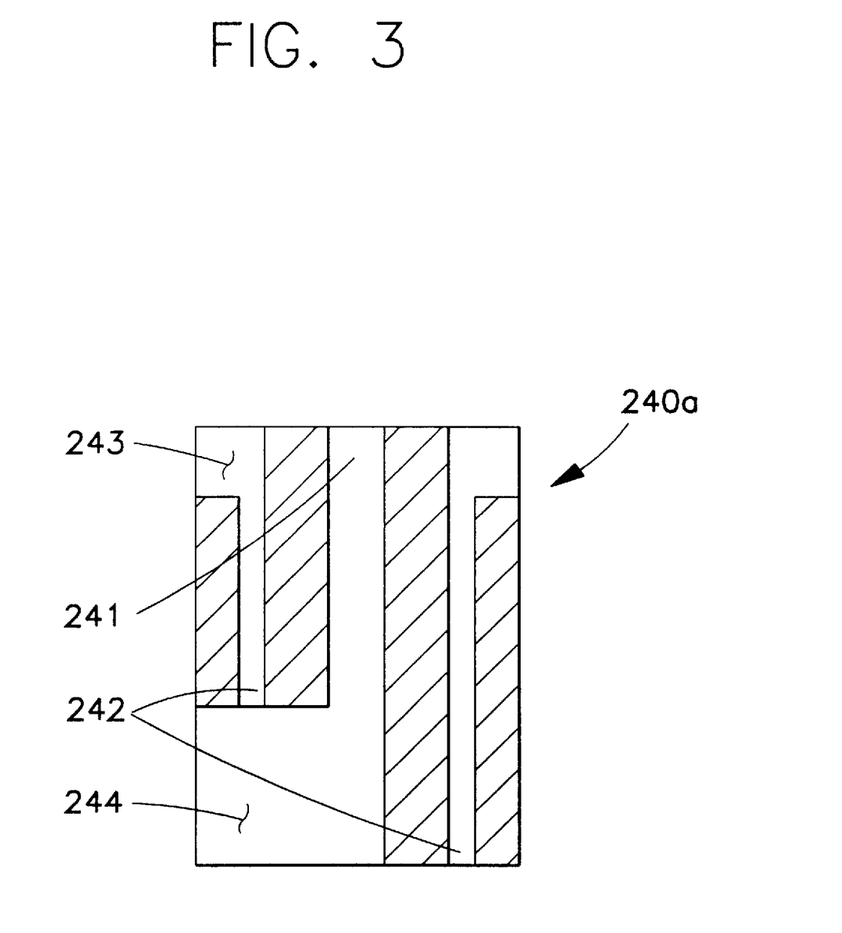
FIG. 3 is a sectional view taken along line III—III of FIG. 2.
Figure 4:
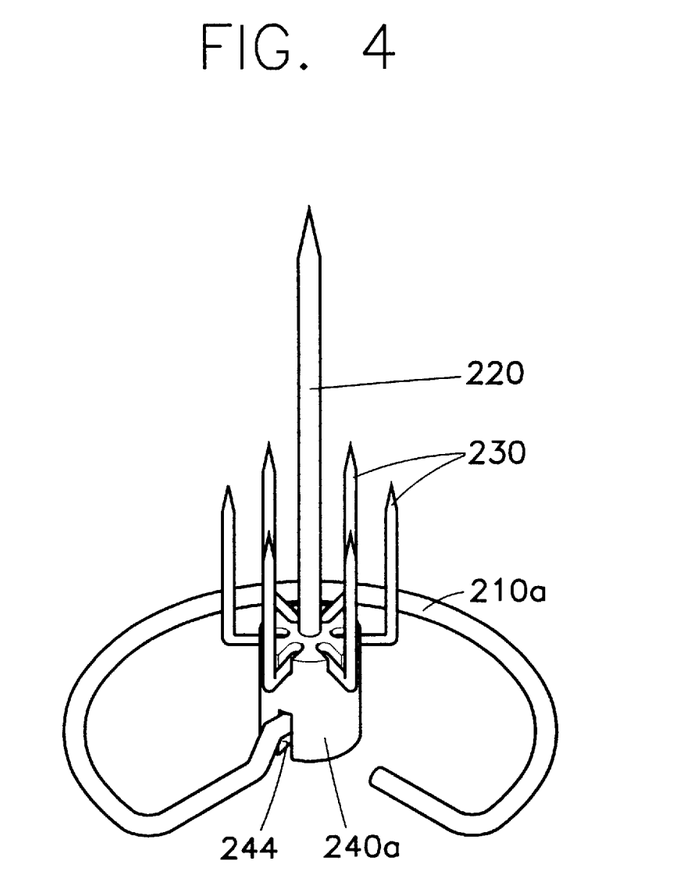
FIG. 4 is an assembled perspective view of the auxiliary cooking device depicted in FIG. 2.

Referring to FIGS. 2, 3 and 4, the auxiliary cooking device 200 comprises a supporting base 210a, a main fixing bar 220 on which relatively big foodstuffs are fixed, a cylindrical coupling member 240a, and a plurality of auxiliary fixing bars 230 (only one is shown) on which relatively small foodstuffs are fixed. The supporting base 210a is disposed on the bottom surface of the cooking chamber 110 or on the cooking tray 130 so as to stably maintain the main fixing bar 220, which is integrally formed therewith, in a stable, erect state. The coupling member 240a is coupled on the main fixing bar 220. The auxiliary fixing bars 230 are fixedly inserted into the coupling member 240a. The combination of these parts will be described more in detail hereinafter.

The supporting base 210a has an opened ring-shape body 213 and supporting legs 212a and 212b which extend inwardly from both ends of the opened ring-shape body 213. The supporting legs 212a and 212b enable the base 210a to stand in a secure and stable state. The supporting leg 212b extends toward a center of the opened ring-shape body 213, and the main fixing bar 220 integrally extends upward from a free end of the supporting leg 212b such that the supporting base 210a is not tilted to any side when foodstuff is fixed on the main fixing bar 220.

The coupling member 240a is removably inserted on the main fixing bar 220. That is, as shown in FIG. 3, formed along a longitudinal central axis of the coupling bar 220 is a through hole 241 through which the main fixing bar 220 is inserted. A plurality of spaced inserting holes 242 into which the auxiliary fixing bars are removably and snugly fitted are radially formed on a periphery of the coupling member 240. On an upper surface of the coupling member 240a, a plurality of spaced upper periphery grooves 243 communicating with the corresponding inserting holes 242 are formed. The periphery grooves 243 prevent, when the auxiliary fixing bars 230 are inserted through the inserting holes 242, the auxiliary fixing bars 230 from inadvertently rotating.

In addition, on a lower surface of the coupling member 240a, a lower periphery groove 244 is formed communicating with the through hole 241. The supporting leg 212b connected to the main fixing bar 220 is inserted into the lower periphery groove. As a result, when the main fixing bar 220 is inserted through the through hole 241, the main fixing bar 220 is prevented from inadvertently rotating. Therefore, the coupling member 240a has an auxiliary function of preventing the rotation of the main fixing bar 220 when it is coupled to the supporting base 210a.

As shown in FIG. 2, each of the auxiliary fixing bars 230 is formed with three straight bar sections. Namely, the auxiliary fixing bars 230 have a first vertical bar section 231 which is inserted into the inserting hole 242 (FIG. 3), a horizontal bar section 232 horizontally and integrally extending from one end of the first vertical bar section 231 and seated on the upper periphery groove 243, and a second vertical bar section 233 vertically and integrally extending from a distal end of the horizontal bar 232 and on which foodstuff to be cooked is fixed. That is, after fixing foodstuff on the second vertical bar 233, the first vertical bar 231 is inserted into the inserting hole 242 so that the horizontal bar 232 is seated in the periphery groove 243.

Figure 5:
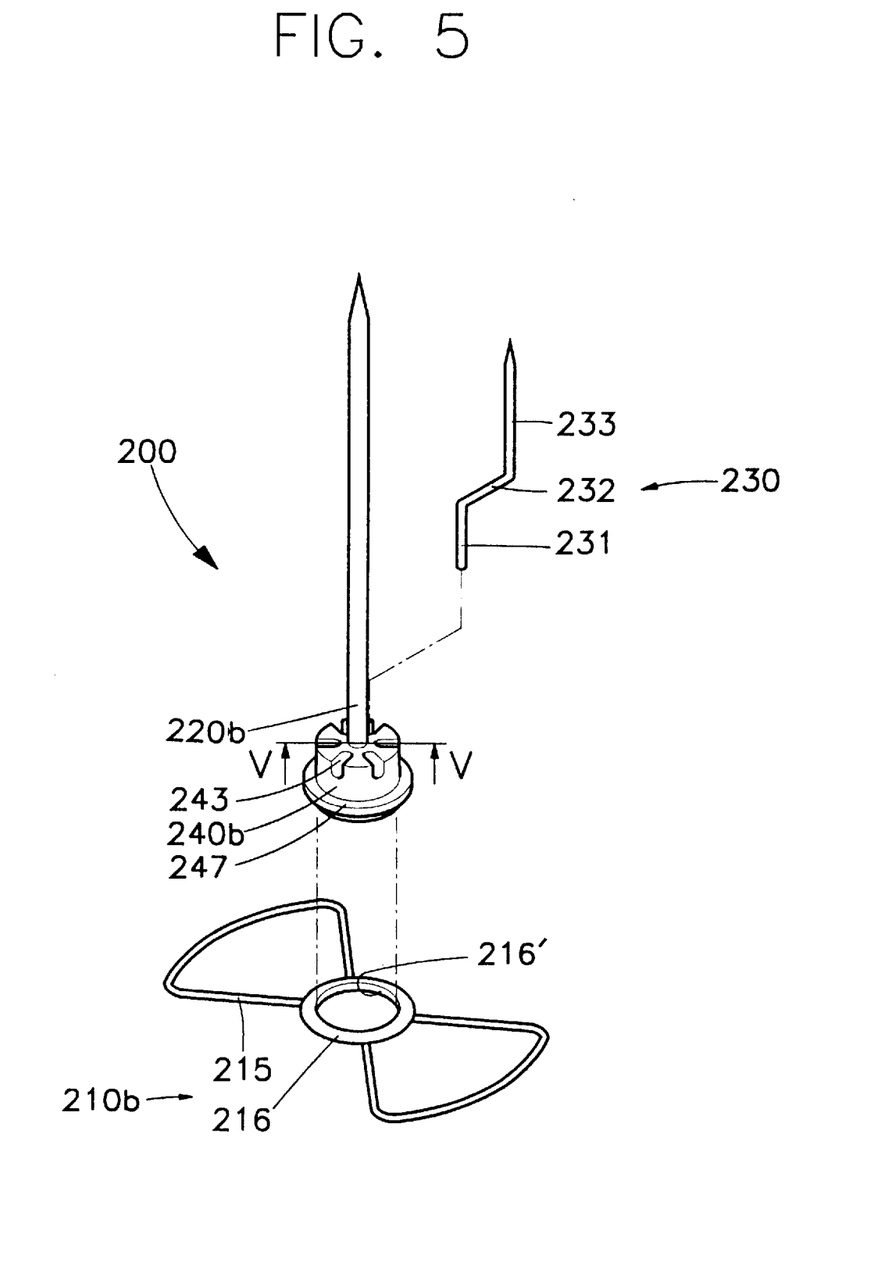
FIG. 5 is an exploded perspective view of an auxiliary cooking device according to a second embodiment of the present invention.
Figure 6:
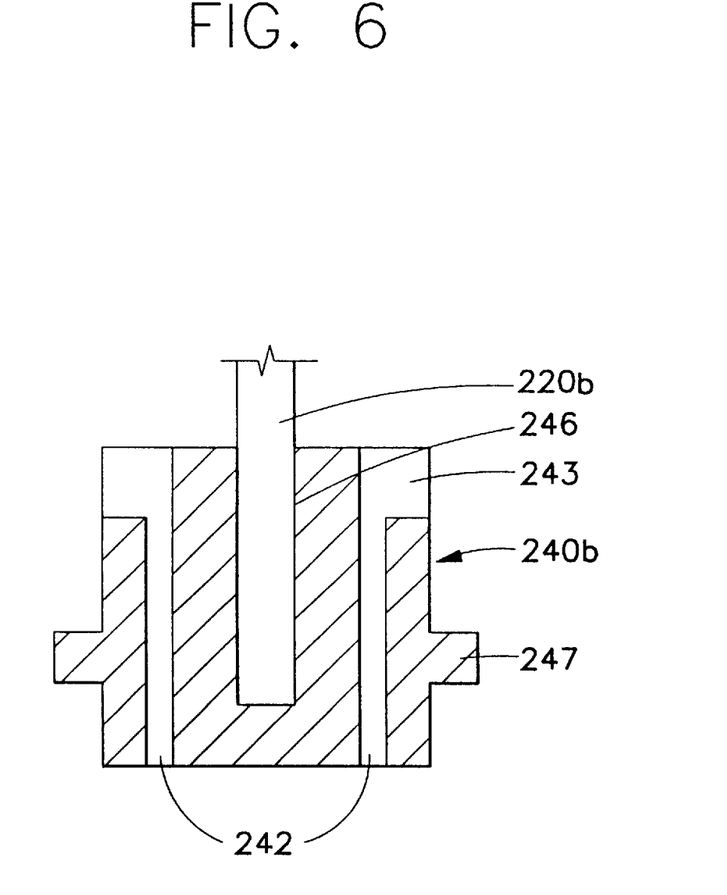
FIG. 6 is a sectional view taken along line V—V of FIG. 5.
Figure 7:
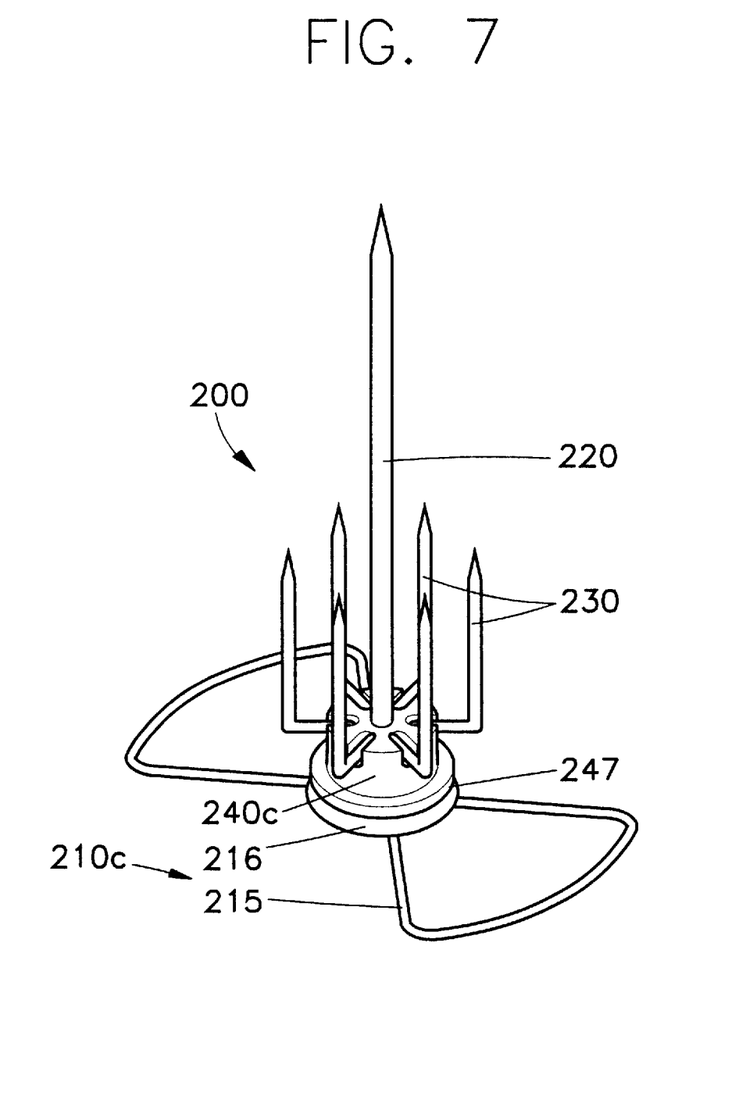
FIG. 7 is an assembled perspective view of FIG. 5.

According to a second embodiment of the present invention, as shown in FIGS. 5, 6 and 7, the main fixing bar 220b is separate from a supporting base 210b. The supporting base 210b comprises a donut-shaped body 216 having an opening 216' and a plurality of triangle-shaped frames 215 which are attached on a circumference of the body 215. The main fixing bar 220b is integrally inserted into a center of a coupling member 240b, the coupling member 240b being disposed in the opening 216'. In addition, the auxiliary fixing bars 230 are removably inserted in the coupling member 240b in a radial direction with respect to the center.

Describing more in detail, as shown in FIG. 6, the coupling member 240b is provided with a coupling hole 246 into which the main fixing bar 220 is inserted and which is formed along a central axis of the coupling member 240b, a plurality of inserting holes 242 into which the auxiliary fixing bars 230 are inserted, and a plurality of periphery grooves 243 formed on a periphery of the upper surface of the coupling member 240b and communicating with the corresponding inserting holes 242, the periphery grooves 243 preventing the auxiliary fixing bars 230 from rotating. In addition, the coupling member 240b is provided with a circumference stopper flange 247 formed on an outer circumference thereof so that when the coupling member 240b is inserted into the opening 216' of the donut shaped body 216, it rests on the body 216. The auxiliary cooking device 200 according to this embodiment also allows the auxiliary fixing bars 230 to be removably inserted into the coupling member 240b as in the above embodiment.

As described in connection with the first and second embodiments of the present invention, the main fixing member 220 can be integrally formed with the supporting base 210a as shown in FIG. 2 or separately formed from the supporting base 210b as shown in FIG. 5.

Figure 8:
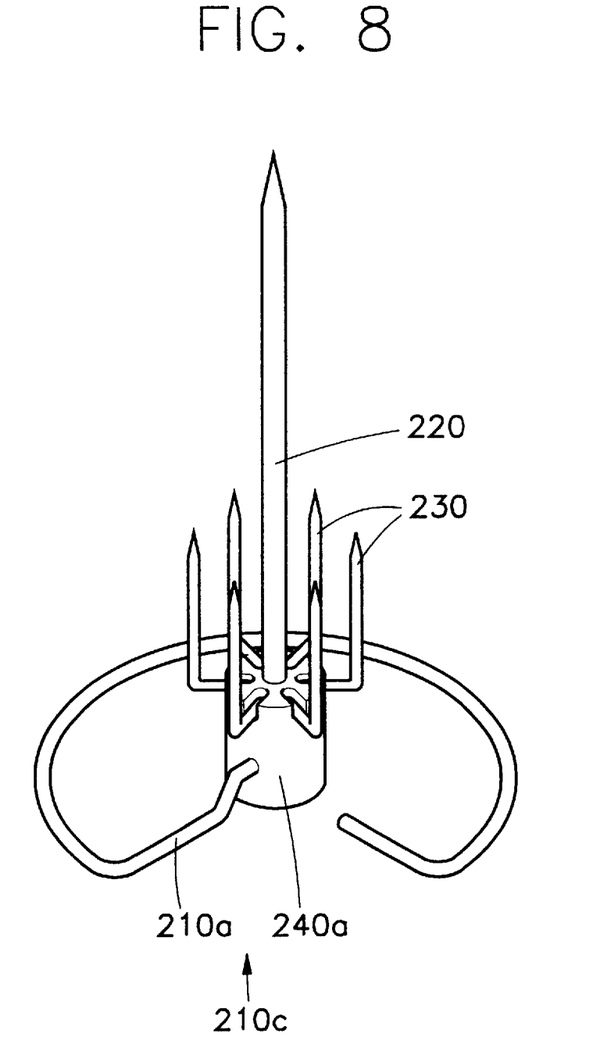
FIG. 8 is a perspective view of an auxiliary cooking device according to a third embodiment of the present invention.
Figure 9:
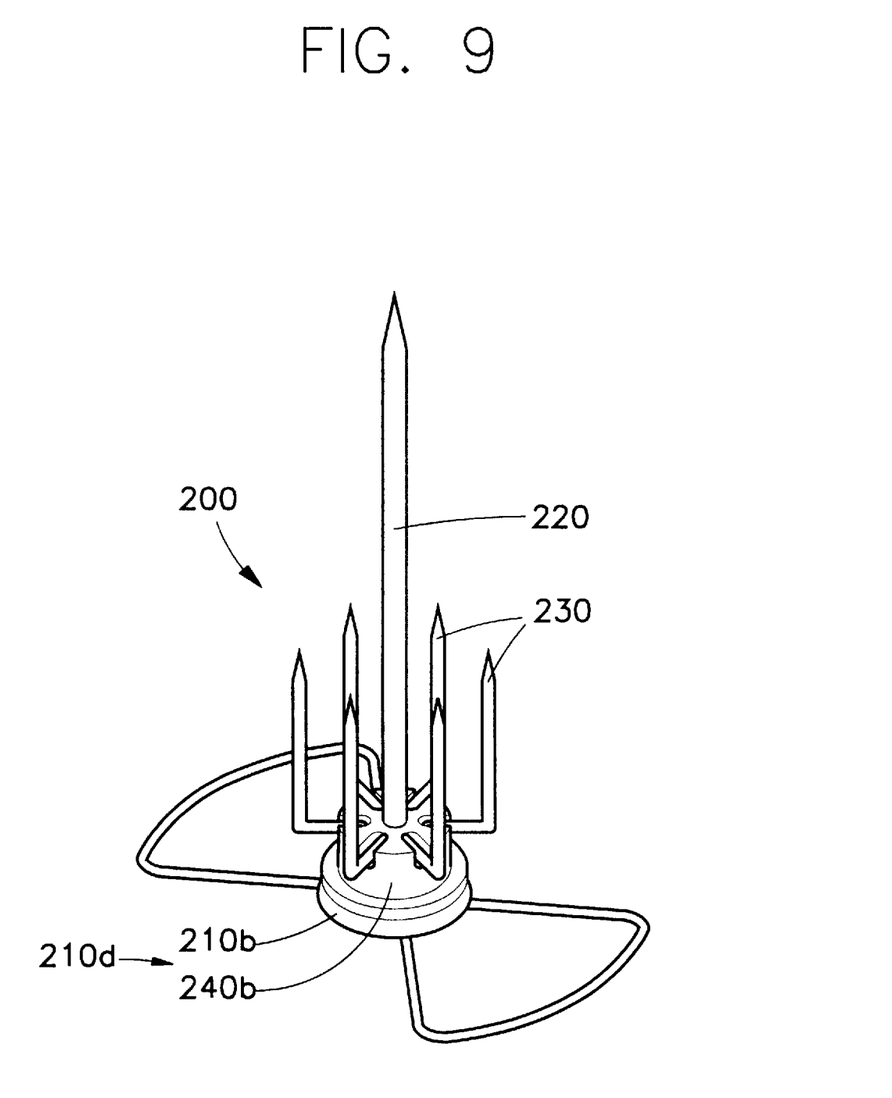
FIG. 9 is a perspective view of an auxiliary cooking device according to a fourth embodiment of the present invention.

Referring to FIGS. 8 and 9 which respectively illustrate auxiliary cooking devices according to third and fourth embodiments of the present invention. A supporting base 210c shown in FIG. 8 is made by integrating the coupling member 240a with the supporting base 210a, both of which are shown in FIG. 2, and a supporting base assembly 210d shown in FIG. 9 is made by integrated the coupling member 240b and the supporting base 210b both of which are shown in FIG. 5. That is, the supporting base, the coupling member and the main fixing bar can be integrally assembled, and the auxiliary fixing bars can be removably mounted on the coupling member.

In addition, the coupling member according to the present invention is made of TEFLON resin material so as to prevent sparks from generating. That is, if the coupling member is made of metal, since the supporting base, the main fixing bar and the auxiliary fixing bars are usually made of metal, sparks can occur at contact areas therebetween.

While the invention has been described in connection with what is presently considered to be most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A microwave oven comprising a cooking chamber and an auxiliary cooking device disposed therein for supporting foodstuffs to be cooked, the auxiliary cooking device comprising:

a main structure including:

a supporting base for supporting the auxiliary cooking device in the cooking chamber; and a coupling member connected to the supporting base, the coupling member having formed therein a plurality of generally vertical inserting holes, and a plurality of generally horizontal upper grooves formed in a top surface of the coupling member and projecting outwardly from upper ends of respective ones of the inserting holes;

a main fixing bar for supporting large foodstuffs and projecting upwardly from the top surface of the coupling member; and auxiliary fixing bars for supporting small foodstuffs and being removably mounted on the coupling member; each of the auxiliary fixing bars including a first generally vertical bar section removably inserted into a respective one of the inserting holes, a generally horizontal bar section having first and second ends, the first end formed of one integral piece with an upper end of the first vertical bar section, the generally horizontal bar section seated in a respective one of the upper grooves for preventing the auxiliary fixing bar from rotating relative to the coupling member, and a second generally vertical bar section formed of one integral piece with the second end of the generally horizontal bar section and extending upwardly therefrom for receiving foodstuff to be cooked.

2. The microwave oven according to claim 1, wherein the supporting base is configured as an opened ring shape, opposite ends of which extend inward so as to define supporting legs; and the main fixing bar extends upward from a free end of one of the supporting legs.

3. The microwave oven according to claim 2, wherein the coupling member further comprises:

a through hole through which the main fixing bar extends; and a generally horizontally extending lower periphery groove communicating with the through hole for receiving one of the opposite ends of the supporting base to prevent the coupling member from rotating relative to the supporting base.

4. The microwave oven according to claim 1, wherein the supporting base includes a plurality of wing portions and a donut-shaped body interconnecting the wing portions; the coupling member coupled to the donut-shaped body.

5. The microwave oven according to claim 4, wherein a circumferential stopper flange engaged with the donut-shaped body is formed on a circumference of the coupling member so as to prevent the coupling member from becoming detached from the donut-shaped body.

6. The microwave oven according to claim 1, wherein the supporting base and the coupling member are integrally formed of one piece.

7. The microwave oven according to claim 1, wherein the coupling member is removably coupled to the supporting base.

8. The microwave oven according to claim 1, wherein the coupling member is made of teflon resin.

9. An auxiliary cooking device adapted for use in a microwave oven, comprising:

a main structure including:

a supporting base for supporting the auxiliary cooking device in the cooking chamber; and a coupling member connected to the supporting base, the coupling member having formed therein a plurality of generally vertical inserting holes, and a plurality of generally horizontal upper grooves formed in a top surface of the coupling member and projecting outwardly from upper ends of respective ones of the inserting holes;

a main fixing bar for supporting large foodstuffs and projecting upwardly from the top surface of the coupling member; and auxiliary fixing bars for supporting small foodstuffs and being removably mounted on the coupling member, each of the auxiliary fixing bars including a first generally vertical bar section removably inserted into a respective one of the inserting holes, a generally horizontal bar section having first and second ends, the first end formed of one integral piece with an upper end of the first vertical bar section, the generally horizontal bar section seated in a respective one of the upper grooves for preventing the auxiliary fixing bar from rotating relative to the coupling member, and a second generally vertical bar section formed of one integral piece with the second end of the generally horizontal bar section and extending upwardly therefrom for receiving foodstuff to be cooked.

* * * * *